US006507798B1

(12) United States Patent
Salvino et al.

(10) Patent No.: US 6,507,798 B1
(45) Date of Patent: Jan. 14, 2003

(54) TIME-FREQUENCY DEPENDENT DAMPING VIA HILBERT DAMPING SPECTRUM

(75) Inventors: Liming W. Salvino, Rockville, MD (US); Robert Cawley, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 175 days.

(21) Appl. No.: 09/688,369

(22) Filed: Oct. 12, 2000

(51) Int. Cl.[7] .............................................. G06F 15/00
(52) U.S. Cl. ........................ 702/75; 702/22; 702/66; 702/75; 702/106; 702/124; 702/189
(58) Field of Search .......................... 702/3, 4, 15–17, 702/19–21, 179–181, 22, 23, 27, 66, 70, 75–78, 106, 124, 126, 189–191, 193–199; 708/300, 303, 304, 317, 320; 84/1.01, 1.19, 1.24, DIG. 9; 73/570, 579, 662, 664, 11.05, 660, 671, 657, 573, 574, 584, 866.5

(56) References Cited

U.S. PATENT DOCUMENTS

| 4,323,145 A | * | 4/1982 | Allen ..................... 188/322.11 |
| 4,429,694 A | * | 2/1984 | McGreevy ............. 128/303.14 |
| 4,433,604 A | * | 2/1984 | Ott .............................. 84/1.19 |
| 4,689,993 A | * | 9/1987 | Slettemoen ................... 73/579 |
| 4,821,205 A | * | 4/1989 | Schutten et al. ............. 364/508 |
| 4,860,265 A | * | 8/1989 | Laster et al. .................. 367/73 |
| 5,065,869 A | * | 11/1991 | Doi et al. ................. 207/140.1 |
| 5,145,024 A | * | 9/1992 | Doi ............................. 180/312 |
| 5,159,547 A | | 10/1992 | Chand |
| 5,197,102 A | * | 3/1993 | Sondermeyer ................ 381/96 |
| 5,227,982 A | * | 7/1993 | Kipple et al. ................ 364/508 |
| 5,520,052 A | * | 5/1996 | Pechersky ..................... 73/579 |
| 5,852,567 A | | 12/1998 | Xia et al. |
| 5,893,054 A | * | 4/1999 | White .......................... 702/189 |
| 5,983,162 A | | 11/1999 | Huang |
| 6,026,687 A | * | 2/2000 | Jury ............................. 73/582 |
| 6,131,071 A | * | 10/2000 | Partyka et al. ................. 702/16 |
| 6,240,783 B1 | * | 6/2001 | McGugin et al. .............. 73/594 |
| 6,301,967 B1 | * | 10/2001 | Donskoy et al. ............... 73/579 |
| 6,314,813 B1 | * | 11/2001 | Uhlig ........................... 73/664 |
| 6,347,542 B1 | * | 2/2002 | Larsson et al. ............ 73/12.12 |
| 6,381,559 B1 | * | 4/2002 | Huang ........................ 702/194 |

OTHER PUBLICATIONS

Proceedings of IMAC XVIII: A Conference on Structural Dynamics held Feb. 7–10, 2000 presented paper entitled Empirical Mode Analysis of Structural Response and Damping, pp. 503–509.

* cited by examiner

Primary Examiner—Marc S. Hoff
Assistant Examiner—Carol S. W. Tsai
(74) Attorney, Agent, or Firm—Jacob Shuster

(57) ABSTRACT

The damping behavior of a physical system is evaluated by mapping of damping loss factors calculated from time-dependent amplitude and frequency functions to form a full time-frequency dependent damping spectrum. The time-dependent amplitude and frequency functions are formulated by calculations based on the intrinsic mode functions derived by empirical mode decomposition of the original time series dataset representing the system behavior. The amplitude and frequency functions for each intrinsic mode function are calculated from the polar representation of the Hilbert transform-based time-dependent complex function corresponding to the intrinsic mode function.

7 Claims, 1 Drawing Sheet

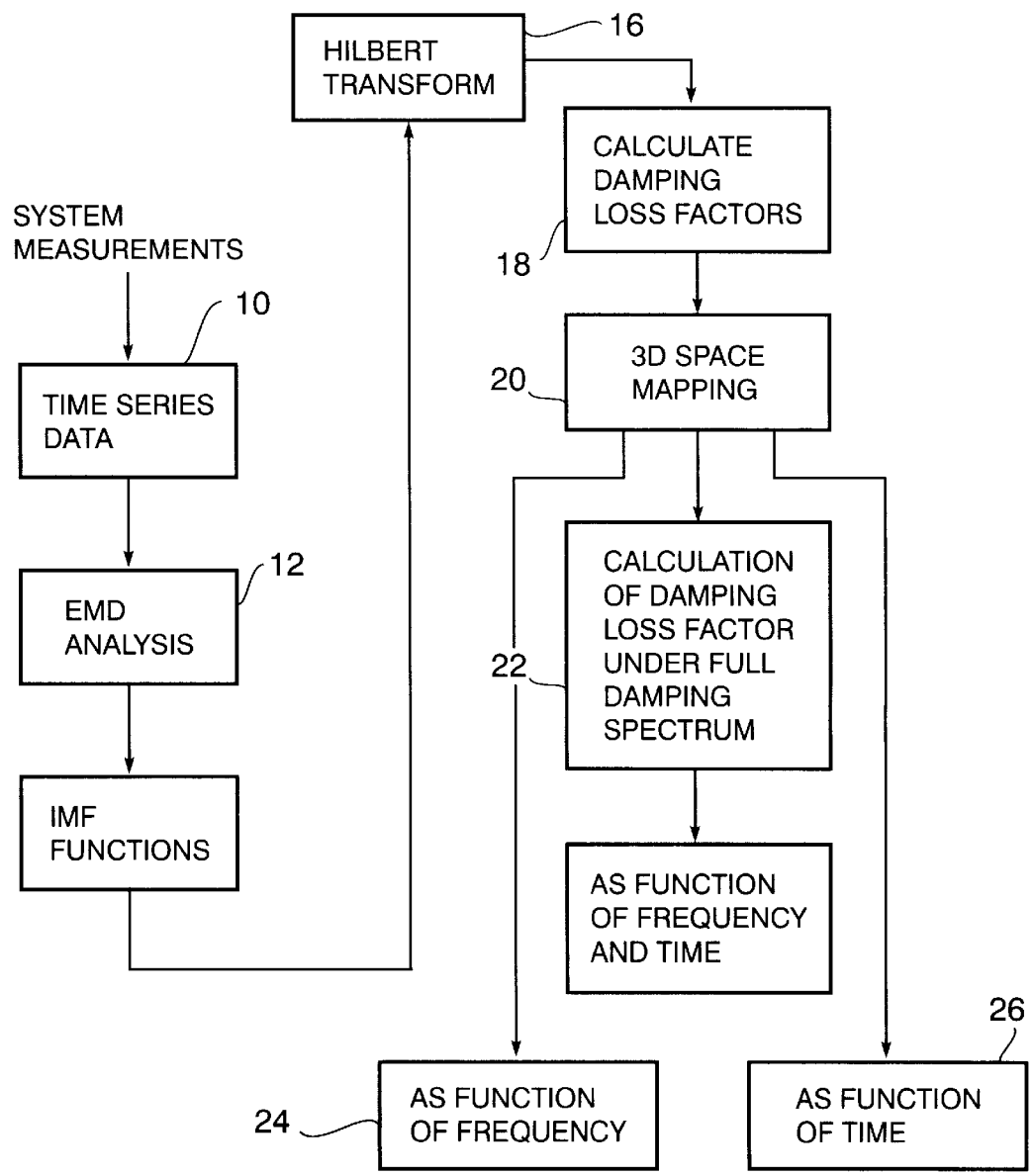

TIME-FREQUENCY DEPENDENT DAMPING VIA HILBERT DAMPING SPECTRUM

The present invention relates in general to mathematical analysis of time series data with respect to damping and decay relaxation effects.

BACKGROUND OF THE INVENTION

Damping effects govern the behavior of a wide variety of physical systems. Extracting damping characteristics from measured data is a practice utilized in scientific and engineering applications. For example, structural damping effects on how a bridge reacts during an earthquake or when aircraft experience turbulence is important in order to enable creation of better and safer designs. Damping parameter extraction algorithms have been developed using a variety of techniques and continue to be of considerable scientific and engineering importance. The present invention is a contribution to this technology area.

An empirical study usually involves analysis of time series obtained through sensors. A method for analysis of such test data exploiting the use of the Hilbert Transform, is explained in U.S. Pat. No. 5,983,162 to Huang, issued Nov. 9, 1999. Through computer implemented Empirical Mode Decomposition (EMD), such method decomposes a given dataset into a sum of Intrinsic Mode Functions (IMFs). The Hilbert Transform employed in the usual way specifies instantaneous amplitude and frequency behavior as functions of time for each IMF. The foregoing procedure enables time-frequency dependent signal-amplitude analysis (Hilbert-Huang Spectrum).

However, more detailed physical characteristics of time series datasets may be needed than that afforded by signal-amplitude analysis, such as transient decay relaxation rates, or damping characteristics of resonant mode families. Heretofore, only somewhat limited conventional analyses have been available to examine the damping characteristics of a system. It is therefore an important object of the present invention to provide a method that fully utilizes the benefits of an improved analytical technique realized by use of the EMD and Hilbert Transform in order to determine damping characteristics.

SUMMARY OF THE INVENTION

In accordance with the present invention the methodology disclosed in the aforementioned U.S. patent to Huang involving analysis of time series data, is expanded into applications such as time-frequency analysis of structural dynamics and structural shock responses involving development of calculation algorithms on time and frequency damping loss factors through which the damping characteristics of a system are evaluated.

As a first step, a time dependent decay rate function is defined for each empirical mode (k). Based on empirical mode decomposition (EMD), a dimensionless quantity as a function of time (t) is then formulated, corresponding to the critical damping ratio, which is one-half the damping loss factor $\eta_k(t)$ at structural resonance. This damping loss factor is then evaluated at given time and instantaneous damped frequency utilizing the Hilbert transform methodology described in the Huang patent hereinbefore referred to. Algorithmic calculation is utilized to quantify and map time-frequency dependent damping loss factors under a full damping spectrum. A root mean square time average of the damping loss factors is then formulated as a function of frequency and averaging time (T) to provide an analysis of the system damping characteristics based on the time series data obtained from single time measurements.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

The drawing FIGURE is a flow chart diagram of a computer based method for analyzing damping behavior of a system utilizing the Hilbert Damping Spectrum, pursuant to the present invention.

DESCRIPTION OF PREFERRED EMBODIMENTS

Referring now to the drawing, it diagrams the algorithmic method of the present invention initiated by input of time series data 10 from measurements of a physical system being analyzed. Under a step 12 derived from the methodology disclosed in U.S. Pat. No. 5,983,162 to Huang, Empirical Mode Decomposition (EMD) is performed to decompose the time series data into a set of simple oscillatory functions denoted as 14, defined as Intrinsic Mode functions (IMF) corresponding to a total of (n) intrinsic modes (k), n being sufficiently large that no further IMFs result from further EMD. Such (IMF) functions 14 must satisfy the conditions that the number of extrema must be equal to the number of zero crossings (or differ by one at most). Such components of the (IMF) functions 14 are obtained by a repeated application of an interactive procedure referred to as "sifting". The original dataset is recovered by summing all of the intrinsic mode functions in accordance with the following equation:

$$X(t) = \sum_{k=1}^{n} c_k(t) + r_n, \tag{A}$$

where $c_k(t)$ is the $k^{th}$ IMF. $X(t)$ is measured timed series data and $r_n$ is a residual term.

The next step 16 of the diagrammed method involves use of a Hilbert transform to define time-dependent amplitudes $a_k(t)$ and frequencies $\omega_k(t)$ for each intrinsic mode (k). For a given intrinsic mode function $c_k(t)$, there is a corresponding Hilbert transform $d_k(t)$ determined by the following equation:

$$d_k(t) = \frac{1}{\pi} P \int_{-\infty}^{\infty} \frac{c_k(t)}{t - t'} dt, \tag{B}$$

where P denotes the Cauchy principal value. A complex signal $Z_k(t)$ is defined by use of the $k^{th}$ IMF function component $c_k(t)$ and its Hilbert Transform $d_k(t)$. Using such components, the physical motion is expressed in terms of amplitude and frequency as shown in the following equations:

$$z_k(t) = c_k(t) + id_k(t); \tag{C}$$

$$a_k(t) = \sqrt{c_k(t)^2 + d_k(t)^2}; \tag{D}$$

-continued $$\theta_k(t) = \tan^{-1}\frac{d_k(t)}{c_k(t)}; \text{ and} \quad (E)$$

$$\omega_k(t) = \frac{d\,\theta_k(t)}{dt}, \quad (F)$$

where $a_k(t)$ is an instantaneous amplitude defined by the complex mode function $z_k(t)$, $\theta_k(t)$ is a monotone instantaneous phase function, and $\omega_k(t)$ is the instantaneous frequency. Systematic extraction of the intrinsic mode functions by computer implemented EMD or sifting as hereinbefore referred to is performed as described in the Huang patent in order to derive the instantaneous phase and frequency functions and complete the diagrammed Hilbert Transform step 16 for each of the modes k=1, 2, 3 . . . n.

Pursuant to the present invention, the Hilbert Transform step 16 is performed so that the frequency function $\omega_{0k}(t)$ is defined by the following equation:

$$\omega_{0k}(t) = \sqrt{\omega_k(t)^2 + \left(\frac{\gamma_k(t)}{2}\right)^2}, \quad (G)$$

in which $\gamma_k(t)$ is defined by the following equation:

$$\gamma_k(t) = \frac{-2\dfrac{d\,a_k(t)}{dt}}{a_k(t)}. \quad (H)$$

Using such amplitude and frequency functions $a_k(t)$ and $\omega_k(t)$ obtained upon completion of step 16, the next step 18 is performed to calculate damping loss factor $\eta_k(t)$ under a Hilbert Damping Spectrum. Damping is thereby described for the k-th mode through step 18 by use of the following equation:

$$\eta_k(t) = \frac{-2\dfrac{d\,a_k(t)}{dt}}{a_k(t)\sqrt{[\omega_k(t)]^2 + \left[\dfrac{1}{a_k(t)}\cdot\dfrac{d\,a_k(t)}{dt}\right]^2}} \quad (I)$$

The damping loss factor $\eta_k(t)$ is expressed independent of mode index (k) by performance of the next step 20 mapping the damping loss factor, Equation (I), for each mode on a time-frequency domain, whereby the loss factor $\eta(\omega,t)$ is extracted for all modes by expression in terms of both frequency ($\omega$) and time (t). Step 20 accordingly involves representation of the damping loss factor $\eta_k(t)$ as a joint function of time and frequency in three dimensional (3D) space. When such 3D space mapping 20 is performed, $\theta_k(t)$ is replaced by $\eta(\omega,t)$ for performance of a following step 22 pursuant to one embodiment of the invention resulting in the full damping spectrum reflected by the following equation:

$$\eta(\omega,t)^2 = \frac{\left[\dfrac{-2}{a(\omega,t)}\cdot\dfrac{d\,a(\omega,t)}{dt}\right]^2}{\omega^2 + \left[\dfrac{\dfrac{d\,a(\omega,t)}{dt}}{a(\omega,t)}\right]^2}. \quad (J)$$

As an alternative or additional embodiment, the damping loss factor output $\eta(\omega,t)$ of mapping step 20 may be utilized to create a loss factor ($\eta$) as a function of only one of either frequency ($\omega$) or time (t) through steps 24 and 26. Thus, a set of sample points is taken over a total sample time (T), a root mean square may be chosen to calculate the damping loss factor in accordance with the following two equations:

$$\eta(\omega,T) = \sqrt{\frac{1}{T}\int_0^T \eta(\omega,t)^2 dt} \quad (K)$$

As T approaches infinity, the foregoing equation is isolated for simplification of loss factor calculation as a function of frequency ($\omega$) under step 24 as follows:

$$\eta(\omega) = \lim_{T\to\infty}\eta(\omega,T) \quad (L)$$

If one chooses a selected frequency band $B=(\omega_1,\omega_2)$ to define a time dependent damping behavior, the damping loss factor as a function of time $\eta(t,B)$ may be calculated under step 26 as follows:

$$\eta(t,B) = \sqrt{\frac{1}{|B|}\int_{\omega_1}^{\omega_2}\eta(\omega,T)^2 d\omega}, \quad (M)$$

where $|B|=|\omega_1-\omega_2|$ is the chosen bandwidth.

Obviously, other modifications and variations of the present invention may be possible in light of the foregoing teachings. It is therefore to be understood that within the scope of the appended claims the invention may be practiced otherwise than as specifically described.

What is claimed is:

1. A method for empirical analysis of damping behavior of a physical system comprising the steps of: receiving time series data representing behavior of said system; performing empirical mode decomposition on said time series data to calculate intrinsic mode functions $c_k(t)$ for a set of modes (k); creating complex function time series, $c_k(t)+id_k(t)$, for said intrinsic mode functions by means of Hilbert transforms $d_k(t)$; defining from polar forms of said complex function time series, time-dependent amplitude functions $a_k(t)$ and time-dependent frequency functions $\omega_k(t)$; calculating a damping loss factor $\eta_k(t)$ for each of said modes from the time dependent amplitude and frequency functions; mapping the damping loss factor for each of said modes into a time frequency domain; calculating a full damping spectrum of the damping loss factors as function of frequency and time from said mapping to evaluate said damping behavior of the physical system; selecting a frequency band; and utilizing root mean square average of the mapped damping loss factors over the frequencies of the selected band to replace the frequency and time functions of the mapped damping loss factors for formulation thereof exclusively as a time-dependent function based on the frequency band $B=(\omega_1,\omega_2)$.

2. A method for empirical analysis of damping behavior of a physical system comprising the steps of: receiving time series data representing behavior of said system; performing empirical mode decomposition on said time series data to calculate intrinsic mode functions $c_k(t)$ for a set of modes (k); creating complex function time series, $c_k(t)+id_k(t)$, for said intrinsic mode functions by means of Hilbert transforms $d_k(t)$; defining from polar forms of said complex function time series, time-dependent amplitude functions $a_k(t)$ and time-dependent frequency functions $\omega_k(t)$; calculating a damping loss factor $\eta_k(t)$ for each of said modes from the time dependent amplitude and frequency functions; mapping the damping loss factor for each of said modes into a time frequency domain; and calculating a full damping spectrum of the damping loss factors as function of frequency and time from said mapping to evaluate said damping behavior of the physical system; and the time-dependent frequency function:

$$\omega_k(t) = \frac{d}{dt}\left[\tan^{-1}\frac{d_k(t)}{c_k(t)}\right];$$

said damping loss factor $\eta_k(t)$ for each of the modes k being:

$$\frac{-2\left[\frac{d\,a_k(t)}{dt}\right]}{a_k(t)\sqrt{[\omega_k(t)]^2 + \left[\frac{d\,a_k(t)/dt}{a_k(t)}\right]^2}}.$$

3. The method as defined in claim 2, wherein each of the damping loss factors $\eta_k(t)$, mapped into the time frequency domain, is:

$$\sqrt{\frac{\left(-2\cdot\left[\frac{1}{a(\omega,t)}\cdot\frac{d\,a(\omega,t)}{dt}\right]\right)^2}{\omega^2 + \left[\frac{\frac{d\,a(\omega,t)}{dt}}{a(\omega,t)}\right]^2}}.$$

4. A method for empirical analysis of damping behavior of a physical system comprising the steps of: receiving time series data representing behavior of said system; performing empirical mode decomposition on said time series data to calculate intrinsic mode functions $c_k(t)$ for a set of modes (k); creating complex function time series, $c_k(t)+id_k(t)$, for said intrinsic mode functions by means of Hilbert transforms $d_k(t)$; defining from polar forms of said complex function time series, time-dependent amplitude functions $a_k(t)$ and time-dependent frequency functions $\omega_k(t)$; calculating a damping loss factor $\eta_k(t)$ for each of said modes from the time dependent amplitude and frequency functions; mapping the damping loss factor for each of said modes into a time frequency domain; and calculating a full damping spectrum of the damping loss factors as function of frequency and time from said mapping to evaluate said damping behavior of the physical system and obtaining root means square over a time period with respect to said mapped damping loss factors for formulation thereof exclusively as a function of frequency $\omega$ based on total sampled time T with said time period approaching infinity; each of the damping loss factors formulated exclusively as a function of the frequency based on total sampled time T being:

$$\sqrt{\frac{1}{T}\int_0^T (\eta(\omega,t))^2 dt}.$$

5. The method as defined in claim 1, wherein the damping loss factors formulated exclusively as a function of time based on frequency band $B=(\omega_1, \omega_2)$ is:

$$\sqrt{\frac{1}{|B|}\int_{\omega_1}^{\omega_2} (\eta(\omega,t))^2 d\omega},$$

and $|B|=|\omega_1-\omega_2|$.

6. In a method for empirical analysis of a physical system to evaluate damping behavior thereof as a function of time (t), the improvement residing in the steps of: calculating a damping loss factor (k) for each of a plurality of modes (K); mapping the damping loss factors; obtaining root means square over a time period with respect to each of the mapped damping loss factors, and formulating the mapped loss factors exclusively as time-dependent functions of frequencies ($\omega$) within a selected frequency band $B=(\omega_1, \omega_2)$.

7. In a method for empirical analysis of a physical system to evaluate damping behavior thereof as a function of time (t), the improvement residing in the steps of: calculating a damping loss factor (k) for each of a plurality of modes (K); mapping the damping loss factors; obtaining root means square over a time period with respect to each of the mapped damping loss factors; and formulating exclusively the damping loss factor as a function of frequency ($\omega$) based on function of total sampled time (T):

$$\sqrt{\frac{1}{T}\int_0^T (\eta(\omega,t))^2 dt}.$$

* * * * *